United States Patent
Audenaert et al.

(10) Patent No.: US 6,320,066 B1
(45) Date of Patent: Nov. 20, 2001

(54) AMINO-FUNCTIONAL UREA-ALKOXYSILANES, A METHOD FOR THE PRODUCTION THEREOF AND THEIR USE

(75) Inventors: Raymond Audenaert, Hamme (BE); Joachim Simon, Düsseldorf (DE); Detley Joachimi; Alexander Karbach, both of Krefeld (DE)

(73) Assignees: Bayer Aktiengesellschaft, Leverkusen (DE); Bayer Antwerpen N.V., Antwerp (BE)

( * ) Notice: Subject to any disclaimer, the term of this patent is extended or adjusted under 35 U.S.C. 154(b) by 0 days.

(21) Appl. No.: 09/806,818

(22) PCT Filed: Sep. 24, 1999

(86) PCT No.: PCT/EP99/07114

§ 371 Date: Apr. 4, 2001

§ 102(e) Date: Apr. 4, 2001

(87) PCT Pub. No.: WO00/20479

PCT Pub. Date: Apr. 13, 2000

(30) Foreign Application Priority Data

Oct. 7, 1998 (DE) ............................................. 198 46 099

(51) Int. Cl.⁷ ........................................................ C07F 7/10
(52) U.S. Cl. ........................................... 556/421; 427/387
(58) Field of Search ............................ 556/421; 427/387

(56) References Cited

U.S. PATENT DOCUMENTS

| | | | |
|---|---|---|---|
| 2,971,864 | 2/1961 | Speier | 117/124 |
| 3,234,159 | 2/1966 | Cooper | 260/29.3 |
| 3,445,441 | 5/1969 | Ruchton | 260/89.5 |
| 3,493,461 | 2/1970 | Sterman et al. | 161/93 |
| 3,576,033 * | 4/1971 | Tesoro et al. | 556/421 |
| 3,746,438 | 7/1973 | Pepe et al. | 260/46.5 E |
| 3,754,971 | 8/1973 | Pepe et al. | 117/72 |
| 3,856,756 * | 12/1974 | Wagner et al. | 556/421 X |
| 3,895,043 * | 7/1975 | Wagner et al. | 556/421 |
| 4,046,794 | 9/1977 | Pepe et al. | 260/448.2 |
| 4,163,073 | 7/1979 | Pepe et al. | 427/221 |
| 4,244,844 | 1/1981 | Molinier et al. | 260/9 |
| 4,374,237 | 2/1983 | Berger et al. | 528/28 |
| 4,626,560 | 12/1986 | Marsden et al. | 523/145 |
| 4,645,816 | 2/1987 | Pohl et al. | 528/28 |
| 4,963,310 | 10/1990 | Mitamura et al. | 264/205 |
| 5,166,383 | 11/1992 | Parrinello et al. | 556/414 |
| 5,266,715 * | 11/1993 | Harisiades et al. | 556/421 X |
| 5,312,943 * | 5/1994 | Gagliani | 556/421 |
| 5,371,261 * | 12/1994 | Wang et al. | 556/421 |
| 5,426,204 * | 6/1995 | Harisiades et al. | 556/421 X |

FOREIGN PATENT DOCUMENTS

| | | |
|---|---|---|
| 0 043 109 | 8/1984 | (EP). |
| 2678936 | 1/1993 | (FR). |
| 94/13473 | 6/1994 | (WO). |

OTHER PUBLICATIONS

Prog Colloid Polym. Sci. (month unavailable) 1977, 105, pp. 80–84, H. Watson, A.E.E. Jokinen, P.J. Mikola, J.G. Matisons and J.B. Rosenholm, Silane treated glass fibers.

* cited by examiner

*Primary Examiner*—Paul F. Shaver
(74) *Attorney, Agent, or Firm*—Joseph C. Gil; Aron Preis

(57) ABSTRACT

A water-soluble compound suitable for coating a variety of substrates is disclosed. The compound is prepared by reacting a diisocyanate with a diamino alkoxysilane, optionally also with a nonionic hydrophilic compound. Suitable substrates include oxides in solid form, glass, mineral and wood.

6 Claims, No Drawings

AMINO-FUNCTIONAL UREA-ALKOXYSILANES, A METHOD FOR THE PRODUCTION THEREOF AND THEIR USE

The present invention relates to water-soluble oligomeric and polymeric alkoxysilane compounds having both urea and amino groups, a process for the preparation thereof and the use thereof for surface modification of solids, in particular for coupling on glass surfaces and for sizing of glass fibres.

The use of functional mono-, bis- and tris-alkoxysilanes for coupling and modification of hydroxy-functional surfaces, specifically glass surfaces, is known (Kirk-Othmer, Encyclopedia of Chemical Technology, Vol. 20, 3rd Ed., J. Wiley, N.Y.). Here, the view generally adopted is that coupling arises as a result of hydrolysis of the alkoxysilane groups to silanol groups and as a result of condensation with hydroxyl groups of the surface (E. Pluedemann, Silane Coupling Agents, Plenum Press, N.Y. 1982).

Alkoxysilanes which have an additional functional group able to form further specific or non-specific bonds are preferably used. For example, alkoxysilanes having methacrylic, acrylic, vinyl, amino or urea groups are used. Functional alkoxysilanes able to form further covalent bonds by way of the reaction of the amino group for example with epoxides, carboxylic acids, isocyanates, carboxylic anhydrides, etc., are particularly preferred. These covalent bonds contribute in particular to coupling and bonding to glass surfaces. Examples of these are in particular amino alkoxysilanes and aminoalkylamino alkoxysilanes (U.S. Pat. No. 2,971,864, U.S. Pat. No. 3,234,159).

Aminosilanes, for example 3-aminopropyl trialkoxysilane and N-aminoethyl-3-aminopropyl trialkoxysilane, are commercial products of, for example, Hüls AG, Marl.

The coupling capability is evidently particularly good if oligomeric or polymeric alkoxysilanes having per molecule more than one alkoxysilane group and additionally further reactive functional groups are used. Examples of these are: amino-amido-functional polymers or oligomers having alkoxysilane groups in the side position (U.S. Pat. No. 3,445,441, U.S. Pat. No. 3,746,738, U.S. Pat. No. 4,1263, 073) or polyesters having alkoxysilane side groups (EP 43 109). In U.S. Pat. No. 4,244,844 these materials are presented as advantageous for application from aqueous solutions. However, these products have a yellow to brown coloration which is undesirable for industrial applications.

U.S. Pat. No. 4,163,073 and EP 43 109 describe polyesters having amino groups and alkoxysilane groups attached to the main chain of unsaturated polyesters.

It is furthermore known that alkoxysilanes which comprise urea groups are advantageous for coupling on glass surfaces (Progr. Colloid Polym. Sci. 1997, 105: 80–84).

FR 2 678 936 describes polyurea polyurethane macromers terminating in alkoxysilane groups. These compounds comprise more than one alkoxysilane group per molecule and no free amino groups.

Polyurethane prepolymers terminating in bis-functional alkoxysilane groups emerge from U.S. Pat. No. 4,374,237. These compounds comprise alkoxysilane groups in the terminal position as well as urea groups and no free amino groups.

3-Ureidopropyl trialkoxysilanes are, for example, commercial products from Hüls AG, Marl. The preparation and use of ureidosilanes are described in U.S. Pat. No. 4,626,560, U.S. Pat. No. 3,754,971 and U.S. Pat. No. 4,046,794, and the use thereof in WO 94/13473. These silanes, in terms of the alkoxysilane groups to be regarded as monofunctional compounds, have one alkoxysilane group with a maximum of three hydrolysable alkoxy groups or three hydroxy groups per molecule. Such silanes have less good properties than those coupling agents having more than just one alkoxysilane group per molecule.

Ureidosilanes are prepared from monoisocyanate-functional alkoxysilanes by reaction with amines in U.S. Pat. No. 3,493,461. According to EP 406 160 urea alkoxysilane compounds are prepared from mono-, bis-, tris- and higher-functional isocyanates with amino alkoxysilanes. UV-curable or polymerizable oligomers terminating in urea groups, which are functionalised with alkoxysilane groups emerge from WO 94/09013. The adhesive strength of these compounds is very markedly limited by the lack of free amino groups.

Oligomeric and polymeric alkoxysilane compounds which can be applied from water have proved to be advantageous for the purpose of coupling. The water simultaneously activates the alkoxysilane compounds by initiating hydrolysis to the reactive silanol groups.

In the case of amino alkoxysilanes therefore particular importance is accorded to those derivatives which are water-soluble or can be applied from the aqueous phase. These derivatives play a particular part in the coating of glass fibres or the formulation of water-based coupling agents.

EP 406 106 describes alkoxysilane compounds having urea groups, which have been developed for the purpose of miscibility with moisture-curing PU systems and whose amino groups have been further reacted-off by imino or aminal groups, such that no reactive amino groups are present. The coupling of these compounds is limited thereby.

The object was therefore to provide and produce suitable colourless oligomeric or polymeric coupling agents for oxidic surfaces, which can be applied from aqueous solvents.

It has surprisingly been found that the reaction of diamino alkoxysilanes such as, for example, N-aminoethyl-3-aminopropyl trialkoxysilane, with diisocyanates leads to uncross-linked, soluble linear urea oligomers and urea polymers having free amino groups in the terminal position and alkoxysilane groups in the side position, which are stable in storage in organic solution, and which afford stable solutions in aqueous solvents. In particular the combination of free amino groups, urea groups and more than one alkoxysilane group per molecule in this case leads to excellent properties.

The present invention provides water-soluble oligomeric or polymeric amino-functional urea alkoxysilane compounds obtainable by reacting a) from 1 to 1.8 equivalents of a diisocyanate with b) 2 equivalents of a diamine consisting of b1) from 80 to 100 wt. % of a diamino alkoxysilane of the formula (I)

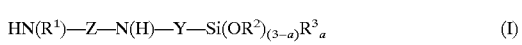

wherein

Z denotes $C_1$–$C_6$-alkylene, $C_5$–$C_{10}$-cycloalkylene or arylene,

R¹ denotes H, $C_1$–$C_6$-alkyl or $C_5$–$C_{10}$-cycloalkyl,
Y denotes $C_3$–$C_6$-alkylene,
R² denotes $C_1$–$C_6$-alkyl or $C_5$–$C_{10}$-cycloalkyl,
a is from 0 to 2, and
R³ denotes $C_1$–$C_6$-alkyl or $C_5$–$C_{10}$-cycloalkyl, and
b2) from 0 to 20 wt. % of at least one nonionic hydrophilic compound comprising ether groups and having per molecule two groups capable of reacting with isocyanate groups, in particular hydroxyl and/or amino groups.

Aromatic, aliphatic, heterocyclic, monocyclic and polycyclic bifunctional isocyanate compounds are preferably suitable as diisocyanates.

Diisocyanates of the formula (II)

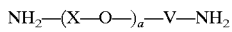

may preferably be used wherein
R denotes $C_1$–$C_6$-alkylene, $C_5$–$C_{15}$-cycloalkylene, $C_6$–$C_{14}$-arylene, $C_7$–$C_{20}$-arylalkylene or $C_7$–$C_{20}$-alkylarylene.

Diisocyanates of the ethylene diisocyanate type, 1,2-diisocyanatopropane, 1,3-diisocyanatopropane, 1,4-butylenediisocyanate (BDI), 1,6-diisocyanatohexane (HDI), 1,2-diisocyanatocyclohexane, 1,3-diisocyanatocyclohexane, 1,4-diisocyanatobenzene, bis(4-isocyanatocyclohexyl) methane (H12MDI), bis(4-isocyanatocyclohexenyl) methane, bis(4-isocyanatophenyl) methane (MDI), 2,4- and 2,6-toluene diisocyanate (TDI), 1,5-diisocyanatonaphthalene, hydrogenated toluene diisocyanate, 1-isocyanatomethyl-5-isocyanato-1,3,3-trimethyl cyclohexane (isophorone diisocyanate, IPDI), 1,6-diisocyanato-2,2,4-trimethyl hexane are preferred.

1,6-diisocyanatohexane and 1-isocyanatomethyl-5-isocyanato-1,3,3-trimethyl cyclohexane (isophorone diisocyanate) are particularly preferred.

Furthermore isocyanates which are on average bis-functional, which have been prepared by reaction or oligomerisation of diisocyanates, can preferably be used. Thus for example, products comprising allophanate, uretdione or biuret groups (such as, for example, Desmodur® N100 from Bayer AG, Leverkusen) or partially trimerised polyisocyanates having iminooxadiazin dione rings or isocyanurate rings (such as, for example, Desmodur® N 3400 from Bayer AG) can preferably be used.

Particularly suitable diamino alkoxysilanes are N-β-(aminoethyl)-γ-aminopropyl trimethoxysilane (Dynasilan® Damo from Hüls AG), N-β-(arainoethyl)-γ-aminopropyl triethoxysilane, N-β-(aminoethyl)-γ-aminopropyl methyldimethoxysilane, N-β-(aminoethyl)-N-β-(aminoethyl)-γ-aminopropyl trimethoxysilane:

($CH_3$—$CH_2$—O)$_3$—Si—$CH_2$—$CH_2$—$CH_2$—NH—$CH_2$—$CH_2$—$NH_2$ ($CH_3$—O)$_3$—Si—$CH_2$—$CH_2$—$CH_2$—NH—$CH_2$—$CH_2$—$NH_2$ ($C_2H_5$O)$_2$($CH_3$)—Si—$CH_2$—$CH_2$—(NH—$CH_2$—$CH_2$)$_3$—NH$CH_2$$CH_2$—$CH_2$—Si($CH_3$)(O$C_2H_5$)$_2$ ($CH_3$—O)$_3$Si—$CH_2$—$CH_2$—$CH_2$—NH—$CH_2$—$C_6H_4$—NH—$H_2$—$CH_2$—Si(O$CH_3$)$_3$ ($CH_3$—O)$_2$($CH_3$)—Si—$CH_2$—$CH_2$—$CH_2$—NH—$CH_2$—$CH_2$—NH—$CH_2$—$CH_2$—$CH_2$—Si($CH_3$)(O$CH_3$)$_2$

N-β-(Aminoethyl)-γ-aminopropyl trimethoxysilane is particularly preferred.

Compounds of the following formula are particularly suitable as compounds under b2):

wherein
X denotes $C_1$–$C_6$-alkylene, branched or unbranched,
a is from 1 to 100, and
V denotes $C_1$–$C_6$-alkylene, branched or unbranched.

The polyether chains of these compounds preferably consist of at least 80%, particularly preferably 100 wt. %, ethylene oxide units, in addition to which propylene oxide units may also be present. Preferred nonionic hydrophilic compounds are, for example, polyethylene glycols of molecular weights 300 to 6,000 (for example Carbowax® 300, 400, 1,000, 1,500, 2,000, 6,000 from Union Carbide), difunctional etherdiamines such as, for example, 4,7-dioxadecane-1,10-diamine, 4,9-dioxadodecane-1,12-diamine, 4,7,10-trioxadecane-1,13-diamine, bis(3-aminopropyl) polytetrahydrofuran, bis(3-aminopropyl) polytetrahydrofuran (products Carbowax® 750, 1,100, 2,100 from BASF) as well as polyether amines (for example Jeffamine® D 230, D 400, D 2,000, XTJ 510 (D 4,000), ED 600, ED 900, ED 2,003, ED 4,000, EDR 148 (XTJ 504) from Texaco Chemical Company).

The following difunctional ether diamines are most particularly preferred: 4,7-dioxadecane-1,10-diamine, 4,9dioxadodecane-1,12-diamine, 4,7,10-trioxadecane-1,13-diamine, bis(3-aminopropyl) polytetrahydrofuran 750, bis (3-aminopropyl) polytetrahydrofliran 1,100, bis(3-aminopropyl)polytetrahydrofuiran 2,100 from BASF and Jeffamine® D 230, D 400, D 2,000, XTJ 510 (D 4,000), ED 600, ED 900, ED 2,003, ED 4,000, EDR 148 (XTJ 504) from Texaco Chemical Company.

Owing to their construction from free amino and urea groups, the substances according to the invention surprisingly afford a substantially improved adhesive strength, in particular on oxidic surfaces and glass surfaces. The films resulting on the surfaces are distinguished by high strength, scratch resistance and transparency, good solvent resistance and good miscibility with low molecular weight functional alkoxysilanes such as, for example, 3-aminopropyl trialkoxysilanes, and are eminently suitable as binders for glass fibre sizes.

The present invention also provides a process for the preparation of the water-soluble oligomeric or polymeric amino-functional urea alkoxysilane compounds according to the invention, which is characterised in that the components a), b1) and optionally b2) which have been described above, are reacted in an organic solvent in which the reaction product is soluble, optionally with the addition of catalysts and/or further additives, at temperatures of from −20° C. to 100° C., preferably 0° C. to 60° C., particularly preferably 0° C. to 40° C., followed by cooling.

Catalysts such as, for example, tertiary amines (for example triethylamine), tin compounds (for example tin-II-octoate, dibutyltin oxide, dibutyltin dilaurate) and other catalysts which are usual for reacting isocyanates are preferred, such as those described, for example, in Becker/Braun, Kunststoff-Handbuch, Vol. 7, Polyurethanes, 1983 Hanser, Munich. Suitable catalysts are also described in Adv. Ureth. Sci. Techn. 12, 1993, 59–85 and in J. prakt. Chem., 336, 1994, 185–200).

N-methylpyrrolidone, diethylene glycol dimethyl ether, methyl ethyl ketone, methyl isobutyl ketone, acetone, butyl acetate, methoxypropyl acetate, methanol, ethanol, propanol, isopropanol, butanol, isobutanol, hexanol, octanol, methoxypropanol, methyl diglycol, ethyl diglycol, butyl diglycol or mixtures of these solvents are preferably used as the solvent. Methanol, ethanol, propanol, isopropanol and acetone are particularly preferred.

It was surprising to those skilled in the art to obtain water-soluble oligomeric or polymeric amino-functional urea alkoxysilane compounds, since it is generally known that the reaction of diamines with diisocyanates leads to higher molecular weight oligourea and polyurea compounds which, however, because of their changed solubility and as a result of cross-linking, during the reaction precipitate directly out of the solvents used.

The invention also provides sizes for glass fibres, which are characterised in that in addition to the conventional constituents of a size they comprise as coupling agents the water-soluble oligomeric or polymeric amino-functional urea alkoxysilane compounds according to the invention.

Not only can the compounds according to the invention, as already described above, be used as coupling agents in glass fibre sizes, but they can also be applied to glass surfaces, used for surface modification of oxidic solids, be employed as binders for particles of glass, mineral and wood, serve in the manufacture of antireflective coatings and be used as lacquers or lacquer constituents.

The invention will be explained in greater detail by reference to the Examples which follow.

EXAMPLES

The isocyanates used in the experiments were 1,6-diisocyanatohexane (HDI) and isocyanatomethyl-5-isocyanato-1,3,3-trimethylcyclohexane (isophorone diisocyanate, IPDI) as well as Desmodur® N3300, Desmodur® N3400 and Desmodur® N3200 from Bayer AG. N-β(Aminoethyl)-γ-aminopropyl trimethoxysilane (A1120 from OSI-WITCO) was used as the amino component b1), and D230, EDR 148, ED 600 from Texaco Chemical Company were used as the component b2).

Example 1

The components b1) and optionally b2) were placed, with cooling, in 200 parts of the solvent. The component a) was then added dropwise, and the temperature was held at 10 to 15° C. Stirring took place until the solution was NCO-free when tested, for example by IR spectroscopy.

|   | Molar ratio b):a) | Component a) | Content by wt. component a) | Component b1) | Content by wt. component b1) | Component b2) | Content by wt. component b2) | Solvent | Solubility |
|---|---|---|---|---|---|---|---|---|---|
| Example 1 |   |   |   |   |   |   |   |   |   |
| a | 2:1 | IPDI | 6.93 | A1120 | 13.8 | — | — | Acetone | + |
| b | 2:1.2 | HDI | 6.3 | A1120 | 13.8 | — | — | Acetone | + |
| c | 2:1.4 | HDI | 7.35 | A1120 | 13.8 | — | — | Acetone | + |
| d | 2:1.4 | HDI | 5.88 | A1120 | 11.1 | — | — | Ethanol | + |
| e | 2:1.2 | HDI | 5.88 | A1120 | 11.1 | — | — | Isopropanol | + |
| Comparison 1 |   |   |   |   |   | — | — |   |   |
| f | 2:1.4 | HDI | 5.88 | A1120 | 11.1 | — | — | Ethyl acetate | − |
| g | 2:1.4 | HDI | 5.88 | A1120 | 11.1 | — | — | Toluene | − |
| h | 2:1.4 | HDI | 5.88 | A1120 | 11.1 | — | — | Xylene | − |

The "Solubility" column indicates whether the product dissolves during and after the reaction (+) or precipitates during or after the reaction (−).

Example 2

The components b1) and optionally b2) were placed, with cooling, in 200 parts of the solvent. The component a) was then added dropwise, and the temperature was held at 10 to 15° C. Stirring took place until the solution was NCO-free when tested, for example by IR spectroscopy.

|  | Molar ratio b):a) | Component a) | Content by wt. component a) | Component b1) | Content by wt. component b1) | Component b2) | Content by wt. component b2) | Solvent | Solubility |
|---|---|---|---|---|---|---|---|---|---|
| Example 2 | | | | | | | | | |
| a | 2:1 | HDI | 5.25 | A1120 | 13.8 | — | — | Methanol | + |
| b | 2:1 | HDI | 5.25 | A1120 | 13.8 | — | — | Methanol | + |
| c | 2:1.4 | HDI | 7.35 | A1120 | 13.8 | — | — | Methanol | + |
| d | 2:1.5 | HDI | 7.9 | A1120 | 13.8 | — | — | Methanol | + |
| e | 2:1.7 | HDI | 8.9 | A1120 | 13.8 | — | — | Methanol | + |
| f | 2:1.5 | IPDI | 10.40 | A1120 | 13.8 | — | — | Methanol | + |
| Comparison 2 | | | | | | — | — | | |
| g | 2:1.5 | N3200 | 9.7 | A1120 | 13.8 | — | — | Methanol | − |
| h | 2:1.3 | N3300 | 13.8 | A1120 | 13.8 | — | — | Methanol | − |

The "Solubility" column indicates whether the product dissolves during and after the reaction (+) or precipitates during or after the reaction (−).

Comparison Example 3

The component b1) was placed, with cooling, in 200 parts of the solvent. The component a) was then added dropwise, and the temperature was held at 10 to 15° C. Stirring took place until the solution was NCO-free when tested, for example by IR spectroscopy.

The "Solubility" column indicates whether the product dissolves during and after the reaction (+) or precipitates during or after the reaction (-).

Example 4

The components b1) and optionally b2) were placed, with cooling, in 560 parts of the solvent. The component a) was then added dropwise, and the temperature was held at 10 to 15° C. Stirring took place until the solution was NCO-free when tested, for example by IR spectroscopy.

| Comparison Example 3 | Molar ratio | Component a) | Content by wt. component a) | Component b1) | Content by wt. component b1) | Component b2) | Content by wt. component b2) | Solvent | Solubility |
|---|---|---|---|---|---|---|---|---|---|
| a | 2:1.4 | HDI | 5.88 | Ethylene diamine | 3.0 | — | — | Methanol | − |
| b | 2:1.4 | HDI | 5.88 | Ethylene diamine | 3.0 | — | — | Ethanol | − |
| c | 2:1.4 | HDI | 5.88 | Ethylene diamine | 3.0 | — | — | Toluene | − |
| d | 2:1.4 | HDI | 5.88 | Hexamethylene diamine | 5.81 | — | — | Methanol | − |
| e | 2:1.4 | HDI | 5.88 | Hexamethylene diamine | 5.81 | — | — | Ethanol | − |
| f | 2:1.4 | HDI | 5.88 | Hexamethylene diamine | 5.81 | — | — | Toluene | − |
| g | 2:1.4 | HDI | 5.88 | Amine L* | 3.62 | — | — | Methanol | − |
| h | 2:1.4 | HDI | 588 | Amine L* | 3.62 | — | — | Ethanol | − |

*Amine L = N,N-bis(3-aminopropyl) methylamine

| Example 4 | Molar ratio | Component a) | Content by wt. component a) | Component b1) | Content by wt. component b1) | Component b2) | Content by wt. component b2) | Solvent | Solubility |
|---|---|---|---|---|---|---|---|---|---|
| a | 2:1.4 | HDI | 23.5 | A1120 | 43.7 | N-(2-hydroxyethyl) ethylenediamine | 0.325 | Methanol | + |
| b | 2:1.4 | HDI | 23.5 | A1120 | 43.01 | N-(2-hydroxyethyl) ethylenediamine | 0.65 | Methanol | + |
| c | 2:1.4 | HDI | 23.5 | A1120 | 41.62 | N-(2-hydroxyethyl) ethylenediamine | 1.3 | Methanol | + |
| d | 2:1.6 | HDI | 26.88 | A1120 | 43.7 | D230 | 0.73 | Methanol | + |
| e | 2:1.6 | HDI | 26.88 | A1120 | 43.7 | EDR 148 | 0.46 | Methanol | + |
| f | 2:1.4 | HDI | 23.5 | A1120 | 43.7 | EDR 148 | 0.46 | Methanol | + |
| g | 2:1.4 | HDI | 23.5 | A1120 | 43.7 | EDR 148 | 0.92 | Methanol | + |
| h | 2:1.4 | HDI | 23.5 | A1120 | 41.62 | EDR 148 | 1.85 | Methanol | + |
| j | 2:1.4 | HDI | 23.5 | A1120 | 38.85 | EDR 148 | 3.70 | Methanol | + |
| k | 2:1.8 | HDI | 30.24 | A1120 | 43.7 | ED 600 | 1.95 | Methanol | + |
| l | 2:1.7 | HDI | 28.56 | A1120 | 43.7 | ED 600 | 1.95 | Methanol | + |
| m | 2:1.6 | HDI | 26.88 | A1120 | 43.7 | ED 600 | 1.95 | Methanol | + |
| n | 2:1.4 | HDI | 23.52 | A1120 | 43.7 | ED 600 | 1.95 | Methanol | + |
| o | 2:1.4 | HDI | 23.52 | A1120 | 43.01 | ED 600 | 3.91 | Methanol | + |
| p | 2:1.4 | HDI | 23.52 | A1120 | 41.62 | ED 600 | 7.83 | Methanol | + |
| q | 2:1.4 | HDI | 23.52 | A1120 | 38.85 | ED 600 | 15.67 | Methanol | + |

The "Solubility" column indicates whether the product dissolves during and after the reaction (+) or precipitates during or after the reaction (−).

The products according to the invention remain in solution during the reaction (corresponds to solubility=+ in the Tables) and can be applied from the solvents used in the synthesis or, after solvent exchange, from suitable solvents which may contain water. Comparison products which demonstrate that not just any diamino derivatives lead to the products according to the invention are listed in Example 3. These when evaluated afforded an unequivocal minus ("−") for solubility (see Table).

Example 5

The glass fibres were prepared as described in, for example, K. L. Loewenstein, "The Manufacturing Technology of Continuous Glass Fibres", Elsevier Scientific Publishing Corp., Amsterdam, London, New York, 1983.

The size consisted of the following components and was applied to glass fibres of 11 μm diameter using a kiss roller. The glass fibres were then dried at 135° C.

| Size components; content expressed as wt. % | Example 5.1 (Comparison) | Example 5.2 | Example 5.3 |
|---|---|---|---|
| 3-aminopropyl triethoxysilane | 0.8 | 0.8 | 0.8 |
| Polyurethane dispersion (Baybond ® PU 0401, commercial product of Bayer AG, Leverkusen | 4 | 4 | 4 |
| Lubricant (polyalkylene glycol) | 0.3 | 0.3 | 0.3 |
| Amino-functional urea alkoxysilane according to Example 2 | — | 0.2 | — |
| Amino-functional urea alkoxysilane according to Example 4 | — | — | 0.25 |
| Water | to 100 | to 100 | to 100 |

Example 6

Use of the coated glass fibres according to the invention 70 parts by weight polyamide 6 (Durethan® BKV 29, from Bayer AG) and 30 parts by weight glass fibres from Examples 5.1, 5.2 and 5.3 were extruded to a moulding composition in an extruder at an extruder temperature of 250° C., and granulated. Test specimens and tensile specimens 80×10×4 mm were prepared from the moulding compositions on a conventional injection moulding machine. Flexural strength was tested in accordance with DIN 53 452, tensile strength in accordance with DIN 53 455 and impact strength at room temperature in accordance with Izod (ISO 180/IC).

|  | Tensile strength (MPa) | Flexural strength (MPa) | Impact strength (kJ/m$^2$) |
|---|---|---|---|
| Glass fibres from Example 5.1 (Comparison) | 167 | 260 | 52 |
| Glass fibres from Example 5.2 | 181 | 276 | 60.4 |
| Glass fibres from Example 5.3 | 182 | 280 | 62.2 |

Applied in sizes to glass fibres, the substances according to the invention afford glass fibre-reinforced plastics which have tensile, flexural and impact strength properties superior to those of corresponding plastics reinforced with normal sized glass fibres.

What is claimed is:

1. Water-soluble oligomeric or polymeric amino-functional urea alkoxysilane compounds obtainable by reacting
   a) from 1 to 1.8 equivalents of a diisocyanate with
   b) 2 equivalents of a diamine consisting of
      b1) from 80 to 100 wt. % of a diamino alkoxysilane of the formula (I)

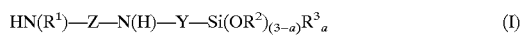
   $$HN(R^1)-Z-N(H)-Y-Si(OR^2)_{(3-a)}R^3_a \quad (I)$$

wherein
   Z denotes $C_1$–$C_6$-alkylene, $C_5$–$C_{10}$-cycloalkylene or arylene,
   $R^1$ denotes H, $C_1$–$C_6$-alkyl or $C_5$–$C_{10}$-cycloalkyl,
   Y denotes $C_3$–$C_6$-alkylene,
   $R^2$ denotes $C_1$–$C_6$-alkyl or $C_5$–$C_{10}$-cycloalkyl,
   a is from 0 to 2, and
   $R^3$ denotes $C_1$–$C_6$-alkyl or $C_5$–$C_{10}$-cycloalkyl, and
      b2) from 0 to 20 wt. % of at least one nonionic hydrophilic compound comprising ether groups and having per molecule two groups capable of reacting with isocyanate groups, in particular hydroxyl and/or amino groups.

2. Process for the preparation of compounds according to claim 1, characterised in that the compounds a), b1) and optionally b2) are reacted together in an organic solvent in which the reaction product is soluble, optionally with the addition of catalysts and/or further additives at temperatures of between −10° C. and +100° C., preferably between 0° C. and 60° C., followed by cooling.

3. A substrate coated with a water-soluble compound that is prepared by reacting
   a) 1 to 1.8 equivalents of a diisocyanate with
   b) 2 equivalents of a mixture of 80 to 100 percent b1) and 0 to 20 percent of b2), the percent, both occurrences relating to the weight of b), wherein said b1) is a diamino alkoxysilane conforming to

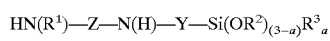
   $$HN(R^1)-Z-N(H)-Y-Si(OR^2)_{(3-a)}R^3_a$$

wherein Z denotes a $C_{1-6}$-alkylene, $C_{5-10}$-cycloalkylene or arylene, $R^1$ denotes H, $C_{1-6}$-alkyl or $C_{5-10}$-cycloalkyl, Y denotes $C_{3-6}$-alkylene, $R^2$ denotes $C_{1-6}$-alkyl or $C_{5-10}$-cycloalkyl, a is 0 to 2, and $R^3$ denotes $C_{1-6}$-alkyl or $C_{5-10}$-cycloalkyl, and where said b2) is at least one nonionic hydrophilic compound the molecular structure of which contains at least one ether group and two groups capable of reacting with isocyanate groups, said substrate being a member selected from the group consisting of oxide in solid form, glass, mineral and wood.

4. The substrate of claim 3 wherein glass is in the form of glass fibers.

5. The substrate of claim 3 wherein each of the groups capable of reacting with isocyanate is selected from among hydroxyl and amino groups.

6. The substrate of claim 4 wherein each of the groups capable of reacting with isocyanate is selected from among hydroxyl and amino groups.

* * * * *